Dec. 13, 1966  E. J. GILBERT  3,290,798
EDUCATIONAL DEVICE

Filed July 20, 1964  2 Sheets-Sheet 1

INVENTOR.
EDWARD J. GILBERT
BY
ATTORNEYS

Dec. 13, 1966  E. J. GILBERT  3,290,798
EDUCATIONAL DEVICE

Filed July 20, 1964  2 Sheets-Sheet 2

INVENTOR.
EDWARD J. GILBERT
BY
ATTORNEYS

United States Patent Office 3,290,798
Patented Dec. 13, 1966

3,290,798
EDUCATIONAL DEVICE
Edward J. Gilbert, 3305 Badger Ave. SW.,
Wyoming, Mich.
Filed July 20, 1964, Ser. No. 383,598
2 Claims. (Cl. 35—31)

This invention relates to educational equipment, and more particularly to an educational device employing interfitting puzzle pieces.

Since the ratio of teachers to students constantly decreases in schools today, and since individual attention to students is still deemed extremely important, various devices have been conceived to form "aids" for the teacher. However, these devices are usually either complex and expensive, or alternatively, inadequate as an effective aid.

To teach mathematics without personal teacher attention, for example, is extremely difficult since the pupil is not sure whether his work is correct or not. Yet, although each student needs extensive practice with various numerical relationships, the teacher simply does not have adequate time to help the students and correct all of the problems. Also, it is important that students know the correctness or incorrectness of their answer immediately upon finishing the problems, especially when starting a new section, since this prevents the development of bad habits so difficult to later overcome.

It is, therefore, an object of this invention to provide a teaching device capable of enabling the student to work a variety of problems and answer relationships by himself, yet knowing after working each problem whether his answer is correct or not.

It is another object of this invention to provide a simple puzzle type teaching device enabling extensive practice by students in working problems, requiring his efforts in reaching the solution, yet indicating to him the propriety of his answer selection. It moreover enables him to repeatedly try the problem until the correct answer is reached. The device is especially adaptable to mathematics. It enables a pair of numbers to be placed in a variety of mathematical relationships, while indicating the correctness of an answer for each. The device can be relatively inexpensively manufactured, moreover, with no electrical components and no parts susceptible to wearing out or becoming broken.

These and several other objects of this invention will become apparent upon studying the following specification in conjunction with the drawings in which.

Referring now specifically to the drawings, the complete device 10 comprises a first table 12 of problem relationships, and specifically illustrating mathematical relationships, a second table 14 having rows of a plurality of individual coded recesses to receive a plurality of individual coded puzzle pieces, and a plurality of interfitting puzzle pieces 16 in the recesses.

Figure 1:
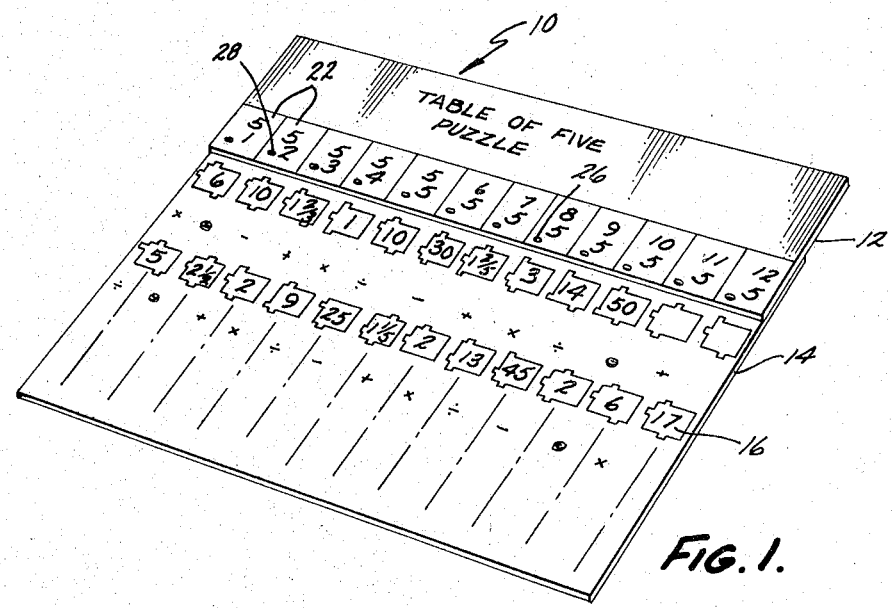
FIG. 1 is a perspective view of one form of the novel device.

When the device is used for learning mathematical relationships, such as the arithmetic problems illustrated in the table in FIG. 1, the table of answers 14 is arranged in a plurality of rows, each independently cooperative with table 12. Thus, for example, there is a first row of mathematical symbols and coded recesses, receiving coded answer puzzle pieces, a second row and normally a third row and fourth row, to accommodate addition, subtraction, division and multiplication relationships between each of the pairs of numbers in the respective, aligned sections 22.

In the particular "table of five" illustrated as an example, the number 5 is in each of the particular sections 22. This forms relationships mathematically of the number 5 to the numbers 1–12, respectively. Thus, 5 may be added to each of these numbers, or the numbers up to 5 may be subtracted from 5 or 5 from the numbers above 5, or the numbers can be multiplied or divided by 5.

Figure 2:
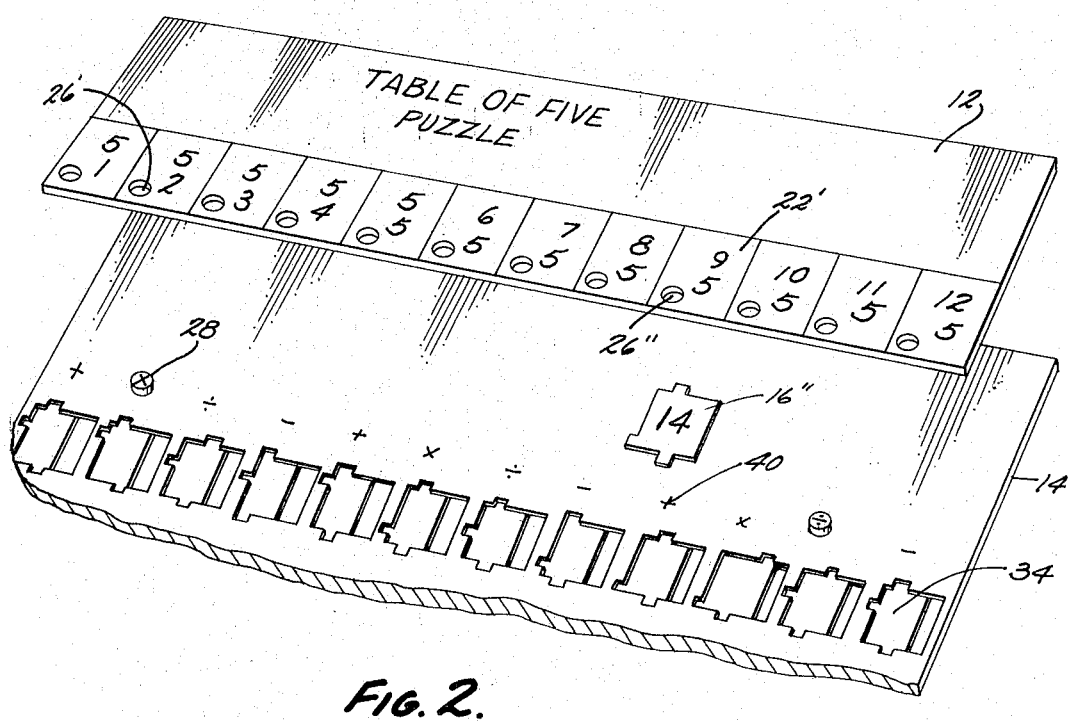
FIG. 2 is a fragmentary, perspective, exploded, enlarged view of the apparatus in FIG. 1.

The table of numerical relationships 12, therefore, includes the two numbers and an adjacent opening 26 in each section 22. Each opening enables the underlying mathematical symbol to be viewed, even though the symbol is affixed to the table of answers 14. Table 12 is interfitted with table 14 by aligning means in the form of a pair of pegs 28 for each row (FIG. 2). These interfit with a selected pair of openings. The particular mathematical symbols are affixed to the top surfaces of the pegs for these respective sections.

Each row of mathematical symbols includes a pair of these pegs, so that table 12 can be interfitted with table 14 in a plurality of positions enabling the numbers to cooperate with each selective row of answer recesses and puzzle pieces.

In the drawings, table 12 is shown in its operative relationship with the first row of cooperative symbols and pieces 18, and is not shown in cooperative relationship with the additional rows since this would be superfluous.

Also, a separate unit like the one illustrated would be utilized with each number, forming a "table of four," a "table of three," etc. Conceivably, the individual number 5 might not be used across the board since any pair of numbers could be associated with each other in each section.

As a matter of fact, in the broader aspects of this device, other question and answer relationships could be provided. The question would be in segment 22 and the answer supplied on the individual puzzle pieces 16. The device finds particular adaptability, however, to mathematical relationships, such as the arithmetical relationships illustrated.

Figure 3:
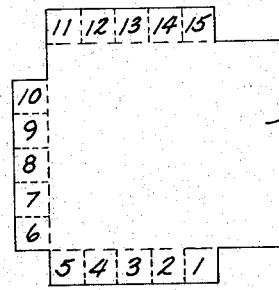
FIG. 3 is an enlarged view of one of the puzzle pieces shown as a master element prior to being coded.

Each of the individual puzzle pieces 16 is basically rectangular in configuration and is relatively thin. The puzzle pieces may all be manufactured like the master piece 16' (FIG. 3), having a plurality of removable segments, 1–15, on three sides of the rectangle. To form a particular code, therefore, selective ones of these projections are removed, by breaking on the perforation lines indicated, or otherwise cut from the main body of the puzzle piece. The answer provided on the face of each puzzle piece is correlated with the particular mathematical symbol and number on the table 12, so that it can be interfitted with a like configurated recess such as recesses 34 in FIG. 2.

Preferably, the table 14 is formed of two layers secured to each other, so that the upper layer can have its coded recesses die-cut therefrom, and be attached to the backing layer to provide a bottom support surface for the puzzle pieces in the recesses.

When utilizing puzzle table 12, therefore, with answer table 14, as illustrated in FIG. 2, the teacher or student will interfit pegs 28 with the corresponding openings 26' to align the numbers with recesses 34. Then, for example, if the student is trying to solve the problem, 9+5, indicated in section 22', the plus symbol would be visible through opening 26". Only the puzzle piece 16" having the correct code projections will interfit to give the correct answer. Therefore, the student goes through the series of problems and select puzzle pieces to provide the correct answers. If any answer is incorrect, the puzzle piece selected will not fit the recesses, and he will know instantly the incorrectness of his attempt. He can repeatedly select numbers which he believes to be correct until he knows it is so by the proper interfit. He then lowers table 12 to the next row of symbols and answer recesses, where openings 26' interfit over the next pair of pegs 28. If the dimension of table 12 from its top edge to openings 26' and 26" is greater than the spacing between pegs 28, suitable recesses (not shown) should be provided in the top back part of table 12 to enable it to fit flatly on table 14 in each position. This is continued through successive rows, providing him with extensive practice with each numerical relationship between the respective pairs of numbers, and yet indicating to him the correctness of his answer in each instance.

Figure 4:
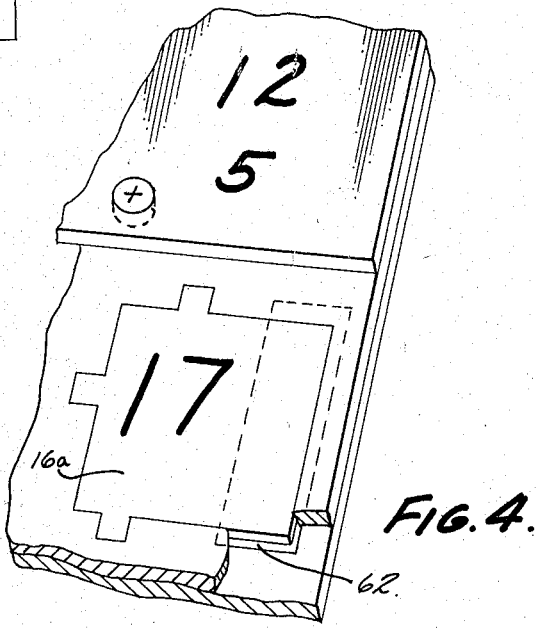
FIG. 4 is a perspective, enlarged fragmentary view of the three components of the apparatus in FIGS. 1 and 2.
Figure 5:
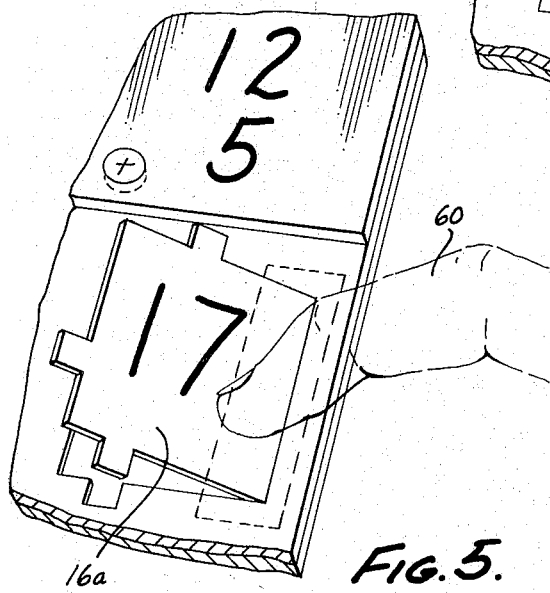
FIG. 5 is a perspective, enlarged, fragmentary view of the apparatus in FIG. 4, showing the individual puzzle piece prior to removal.

The puzzle pieces can be individually removed with ease. If the teacher or student wishes to remove a puzzle piece from its recess (for example the puzzle piece indicating number 17 in FIG. 4), he merely depresses with his finger 60 the edge of the piece not containing a code projection. This fourth edge is located over a corresponding edge of the recess not having a lateral code slot. Rather, the bottom edge of this edge of the recess includes a depression opening 62 in the supporting bottom surface. Therefore, the puzzle piece 16a can be tipped as illustrated in FIG. 5 for grasping by the fingers and removing.

For optimum tipping action of the puzzle pieces the code projections are purposely not extended over the tipping slot 62. Rather, they are all toward the opposite side of the pieces as shown by the master piece in FIG. 3.

It will be obvious to those having ordinary skill in this field, that certain details of this structure could be modified somewhat without departing from the broader concept presented. Also, it is obvious that various different relationships between the two tables could be presented that would merely be superfluous, in addition to the material described and shown. Therefore, this invention is to be limited only by the scope of the appended claims and the reasonably equivalent structures to those defined therein.

I claim:

1. A methematical problem and answer device comprising: a first table having a row of separate numerical relationships; a second table having a plurality of rows of mathematical symbols and adjacent correlative rows of openings for receiving puzzle pieces; said first table and said second table including alignment means therebetween allowing said row of numerical relationships to be selectively positioned adjacent one of said plurality of rows of symbols and the correlative row of openings; a plurality of separate puzzle pieces, each containing an answer to a particular mathematical relationship between said numerical relationships; and said pieces and openings having respective interfitting code means thereon allowing reception of each puzzzle piece in the proper opening to indicate the correct answer to each numerical relationship.

2. A puzzle type problem and answer device comprising: a table of problem relationships; a plurality of individual and different puzzle pieces, each having thereon an answer corresponding to a particular problem relationship on said table, and each being configurated according to a code; a table of coded receiving means, each configurated to physically interfit with a correspondingly coded, particular puzzle piece; and said table of coded receiving means being correlative to said table of problem relationships to indicate the correct answer to the problem relationships when said coded puzzle pieces are correctly interfitted with said receiving means; each of said puzzle pieces having a generally rectangular configuration and a plurality of code projections extending laterally from three side edges thereof; each of said receiving means comprising a generally rectangular main cavity to receive said body, having a support bottom, and having a plurality of coded slot extensions along three side edges thereof; and said bottom having a depression along one side edge beneath the fourth side edge of the interfitting piece, enabling the piece to be tipped for removal by pressure applied on said edge.

References Cited by the Examiner

UNITED STATES PATENTS

| | | | |
|---|---|---|---|
| 1,624,450 | 4/1927 | Vershbinsky | 35—31.4 |
| 1,735,456 | 11/1929 | Garman | 35—71 |
| 2,711,595 | 6/1955 | Sharp | 35—35.8 |
| 2,892,267 | 6/1959 | Harvey | 35—31.4 |
| 3,224,114 | 12/1965 | Swanson | 35—31 |

References Cited by the Applicant

UNITED STATES PATENTS

| | | |
|---|---|---|
| 1,402,807 | 1/1922 | Tegtmeyer et al. |
| 1,766,465 | 6/1930 | Snelling. |
| 1,946,318 | 2/1934 | Hamilton. |

EUGENE R. CAPOZIO, *Primary Examiner.*

W. GRIEB, *Assistant Examiner.*